United States Patent [19]
Saito et al.

[11] Patent Number: 6,019,396
[45] Date of Patent: Feb. 1, 2000

[54] PIPE CONNECTING APPARATUS

[75] Inventors: Kikuo Saito, Hyogo-ken; Yasushi Shimonaka, Takatsuki; Hideki Yoneyama; Akihito Totsugi, both of Sanda, all of Japan

[73] Assignee: Waterworks Technology Development Organization Co., Ltd., Osaka, Japan

[21] Appl. No.: 09/137,671

[22] Filed: Aug. 21, 1998

[51] Int. Cl.[7] .............................. F16L 21/06; F16L 35/00
[52] U.S. Cl. ................... 285/3; 285/337; 285/322
[58] Field of Search ................................. 285/337, 322, 285/323, 374, 3

[56] References Cited

U.S. PATENT DOCUMENTS

| | | |
|---|---|---|
| 4,116,478 | 9/1978 | Yamaji et al. . |
| 4,878,698 | 11/1989 | Gilchrist . |
| 5,069,490 | 12/1991 | Halen ....................................... 285/337 |
| 5,100,183 | 3/1992 | Montesi et al. ........................... 285/337 |
| 5,297,826 | 3/1994 | Percebois et al. ................... 285/323 X |
| 5,803,513 | 9/1998 | Richardson ........................... 285/337 X |

*Primary Examiner*—Dave W. Arola
*Attorney, Agent, or Firm*—Fulbright & Jaworski, LLP

[57] ABSTRACT

A pipe connecting apparatus for connecting a first pipe with a second pipe inserted into the first pipe member is disclosed. The apparatus includes an elastic seal to be disposed within a gap formed between an inner peripheral face of the first pipe and an outer peripheral face of the second pipe, the elastic seal being compressed in an axial direction along the axis of the first pipe for sealing the gap, a press ring fitted on the second pipe, the press ring being movable on the outer peripheral face of the second pipe in the axial direction, and a retainer member fitted on the second pipe, the retainer member having a locked condition in which the retainer member is pressed against the second pipe and a released condition in which the retainer member is radially expanded to be released from the locked condition, the retainer member being switched over from the released condition to the locked condition in association with a movement thereof relative to the press ring. A sequentially operative mechanism is operative to press the elastic seal alone in the axial direction while the retainer member is at the released condition in a first state where the compressive force is low, the sequentially operative mechanism being operative to allow the retainer member to be switched over to the locked condition in a second state where the compressive force is high.

20 Claims, 9 Drawing Sheets

(a)

(b)

(c)

PRIOR ART

PIPE CONNECTING APPARATUS

BACKGROUND OF THE INVENTION

1. Field of the Invention

The present invention relates to a pipe connecting apparatus for connecting a first pipe member having an inner peripheral face and an axis with a second pipe member inserted into the first pipe member. More particularly, the invention relates to a pipe connecting apparatus for use in a pipe system of a fluid transport pipe such as a water pipe installed under the ground in order to prevent inadvertent withdrawal of the second pipe member inserted into and connected with the first pipe member by an external tensile force in the axial direction of the pipe which may be applied to the system due to an earthquake, differential settlement or the like.

2. Description of the Related Art

According to a conventional pipe connecting apparatus, as shown in FIGS. 12 and 13, over an insertion pipe portion 51 (an example of the second pipe member) inserted into and connected with a receiver pipe portion 50 (an example of the first pipe member), there are fitted an elastic seal 52 capable of sealing between an inner peripheral face of the receiver pipe portion 50 and an outer peripheral face of the insertion pipe portion 51 and a press ring 53 having a substantially C-shaped configuration as seen in the axial direction X of the pipe, the press ring 53 being capable of compressing the elastic seal 52 from the axial direction X and also of elastically deformable to be reduced in its diameter. A first fastener means 54 is provided for fastening the press ring 53 and the receiver pipe portion 50 together in the pipe axial direction X. In addition, in many cases, between the outer peripheral face of the insertion pipe portion 51 and the inner peripheral face of the press ring 53, there is interposed a retainer ring 55 having a substantially C-shaped configuration as seen from the pipe axial direction and capable of being elastically deformed to be reduced in its diameter until the ring 55 is pressed against the outer peripheral face of the insertion pipe portion 51.

As described above, the press ring 53 is provided as the C-shaped ring having one cutout portion in the periphery thereof which is capable of elastically deformable to be reduced in its diameter. This press ring 53 integrally includes, at opposed free peripheral ends thereof, a pair of connecting pieces 53A opposed to each other in a direction substantially normal to the pipe axial direction X (i.e. along the peripheral direction of the pipe). And, across these connecting pieces 53A, there is provided a second fastener means 56 which is fastened in said normal direction to elastically deform the press ring 53 in the diameter-reducing direction, thus elastically deforming the retainer ring 55 in the diameter-reducing direction.

More particularly, at a plurality of peripheral portions at an end of the outer peripheral face of the receiver pipe portion 50, there are integrally formed first connecting projections 50A. On the other hand, at corresponding plural peripheral portions in the outer peripheral face of the press ring 53, there are integrally formed second connecting projections 53B. And, the first fastener means 54 described above comprises plural sets of T-shaped bolts 54A and nuts 54B fitted across these respective paired connecting projections 50A, 53B of the receiver pipe portion 50 and the press ring 53. The second fastener means 56 comprises a pair of a bolt 56A and a nut 56 which are inserted and fitted across the opposed connecting pieces 53A of the press ring 53 described above.

Further, in many cases, an inner peripheral face 53a of the press ring 53 includes a tapered face adapted for further pressing the retainer ring 55 against the outer peripheral face of the insertion pipe portion 51 in response to a possible mutual withdrawal displacement between the receiver pipe portion 50 and the insertion pipe portion 51.

With the conventional pipe connecting apparatus described above, in connecting the receiver pipe portion 50 and the insertion pipe portion 51, first, the press ring 53 which is still in a diameter-expanded condition and supporting the retainer ring 55 will be fitted over the insertion pipe portion 51 which was inserted in advance into the receiver pipe portion 50. Next, the second connecting projections 53B of the press ring 53 and the first connecting projections 50A of the receiver pipe portion 50 retaining the elastic seal 52 therein will be temporarily connected and loosely fastened together. Thereafter, the insertion pipe portion 51 will be inserted by a predetermined length into the receiver pipe portion 50 through the retainer ring 55 and the elastic seal 52 retained to the inner peripheral face of the press ring 53. Then, the bolts 54 and the nuts 54B of the first fastener means 54 will be fastened so as to fixedly connect the first connecting projections 50A of the receiver pipe portion 50 and the second connecting projections 53B of the press ring 53. At the same time, with the mutually approaching movement between the two pipe portions 50, 51 associated with the above-described fixing and connecting operation thereof, the elastic seal 52 will be compressed in the pipe axial direction X so as to seal between the inner peripheral face of tie receiver pipe portion 50 and the outer peripheral face of the insertion pipe portion 51.

After completion of the compressive sealing operation of the elastic seal 52, the bolt 56A and nut 56B of the second fastener means 56 fitted across the connecting pieces 53A of the press ring 53 will be fastened, so that this ring 53 will be elastically deformed in the diameter-reducing direction. This elastic deformation of the press ring 53 causes elastic diameter-reducing deformation of the retainer ring 55, so that the retainer ring 55 will 'bite into' the outer peripheral face of the insertion pipe portion 51.

In summary, the conventional pipe connecting apparatus requires the fastening operation of the first fastener means 54 in the pipe axial direction X for compressing the elastic seal 62 and the further fastening operation of the second fastener means 56 in the pipe radial direction for elastically compressing the retainer ring 65 for the bite-in engagement. In this manner, the assembly operation of the conventional apparatus is troublesome as requiring many steps. Further, the apparatus requires a significant number of components for providing these fastener means; and also, in connection with this requirement, it is also necessary to form a number of connecting projections and bolt-inserting holes in the receiver pipe portion 50 and the press ring 53, respectively. This tends to result in complexity of the entire construction as well as increase in the manufacture cost.

Moreover, if the second fastener means 56, rather than the first fastener means 54, is fastened first by an error, the retainer ring 55 will bite into the outer peripheral face of the insertion pipe portion 51. Then, if the first fastener means 54 is fastened under this condition, the resultant mutual approaching displacement between the press ring 53 and the receiver pipe portion 50 will cause displacement of the insertion pipe portion 51 together with the press ring 53 via the retainer ring 55, so that the pipe portion 51 will be inserted further into the receiver pipe portion 50, thus leading to a change in the insertion length of this insertion pipe portion 51 into the receiver pipe portion 50. Moreover, if the leading end of the insertion pipe portion 51 comes into abutment against a projection 50B on the inner peripheral face of the receiver pipe portion 50, any further fastening operation will be disabled, thus inviting sealing defect due to insufficient compression of the elastic seal 2.

In view of the above-described state of the art, a primary object of the present invention is to provide a pipe connecting apparatus which allows the connection between the first pipe member and the second pipe member inserted therein to be effected reliably and efficiently for providing reliable sealed connection therebetween with maximally maintaining the originally set insertion length of the latter relative to the former and which also allows simple construction and reduction in its manufacture costs through reduction in the number of components needed for constructing the apparatus.

SUMMARY OF THE INVENTION

For accomplishing the above-noted object, in a pipe connecting apparatus for connecting a first pipe member having an inner peripheral face and an axis with a second pipe member inserted into the first pipe member, according to the present invention, the apparatus comprises a

- an elastic seal to be disposed within a gap formed between an inner peripheral face of the first pipe member and an outer peripheral face of the second pipe member, the elastic seal being compressed in an axial direction along the axis of the first pipe member for sealing the gap;
- a press ring fitted on the second pipe member, the press ring being movable on the outer peripheral face of the second pipe member in the axial direction;
- a retainer member placed around the outer peripheral face of the second pipe member, the retainer member having a locked condition in which the retainer member is pressed against the outer peripheral face of the second pipe member and a released condition in which the retainer member is radially expanded to be released from the locked condition, the retainer member being switched over from the released condition to the locked condition in association with a movement thereof in the axial direction relative to the press ring;
- a sequentially operative mechanism interposed between the press ring and the elastic seal for transmitting said axial movement of the press ring to the elastic seal as the compressive force thereto, the sequentially operative mechanism being operative to press the elastic seal alone in the axial direction while maintaining the retainer member at the released condition in a first state where the compressive force is below a predetermined value, the sequentially operative mechanism being operative to allow the retainer member to be switched over to the locked condition in association with the movement thereof relative to the press ring in a second state where the compressive force is above the predetermined value.

According to the pipe connecting apparatus of the invention having the above-described construction, first, the second pipe member will be inserted into the first pipe member by a predetermined length and the press ring will be fastened in the axial direction toward the elastic seal which is disposed within the gap between the inner peripheral face of the first pipe member and the outer peripheral face of the second pipe member. With this fastening operation, the press ring and the first pipe member will be axially moved closer to each other. In the course of this, by the function of the sequentially operative mechanism interposed between the press ring and the elastic seal, in the first state where the compressive force transmitted from the press ring to the elastic seal is below a predetermined value, in other words, during a former half of the fastening operation, the retainer member will be maintained under the released condition and the elastic seal alone will be compressed in the axial direction so as to seal the gap between the inner peripheral face of the first pipe member and the outer peripheral face of the second pipe member. Thereafter, when the second state is realized in which the compressive force exceeds the predetermined value, in other words, in the latter half of the fastening operation, the retainer member will be switched into the locked condition and be pressed against the outer peripheral face of the second pipe member.

Namely, according to the above-described construction of the present invention, the operation for compressing the elastic seal into the sealed condition and the subsequent operation for pressing the retainer ring against (or into) the outer peripheral face of the insertion pipe portion may take place sequentially only by the continuation of the single fastening operation for pressing the press ring against the elastic seal. That is, during the former half of the fastening operation, i.e. while the press ring is being moved relative to the first pipe member for compressing the elastic seal, the retainer member still maintains its released condition, so that the retainer member will not be pressed against the outer peripheral face of the second pipe member. Therefore, during this former half of the fastening operation, there will occur no inadvertent movement of the second pipe member relative to the first pipe member by the press ring via the retainer member.

Accordingly, the invention has fully achieved its intended object of providing a pipe connecting apparatus which allows the connection between the first pipe member and the second pipe member inserted therein to be effected reliably and efficiently for providing reliable sealed connection therebetween with maximally maintaining the originally set insertion length of the latter relative to the former and which also allows simple construction and reduction in its manufacture costs through reduction in the number of components needed for constructing the apparatus, in comparison with the conventional apparatus.

Preferably, the sequentially operative mechanism includes an intermediate pressing element having a face to come into contact with the elastic seal and a space-regulating element for maintaining an axial opposing space between the press ring and the intermediate pressing element within a range allowing the released condition of the retainer member; and the space-regulating element releases the space maintenance in said second state and allows the retainer member to be switched over to the locked condition in association with the axial movement of the retainer member relative to the press ring.

With the construction described above, when the press ring is fastened with the second pipe member being inserted into the first pipe member by the predetermined length, during the former half of this fastening operation, the moving force of the press ring being moved closer to the first pipe member will be transmitted via the intermediate pressing element and applied as an axial compressive force to the elastic seal, so that this elastically compressed elastic seal will reliably seal the gap between the inner peripheral face of the first pipe member and the outer peripheral face of the second pipe member. In this, until the elastic seal is compressed up to a predetermined compressed state, the space-regulating element adapted for maintaining the axial opposing space between the intermediate pressing element and the press ring functions to maintain the retainer member under its initial non-radially compressed condition or the condition not to bite into the outer peripheral face of the second pipe member.

Then, when the elastic seal is compressed into the predetermined compressed state, the space-regulating element releases its space maintenance. So that, in association of further fastening operation, the intermediate pressing element and the press ring will start moving closer to each other in the axial direction; and with progress of this mutual approaching movement the retainer member will be pressed against the outer peripheral face of the second pipe member.

The above construction requires only the incorporation of the intermediate pressing element and the space-regulating element together constituting the sequentially operative mechanism between the press ring and the retainer member axially opposed to each other across the elastic seal. Hence, the entire pipe connecting apparatus may be formed simple and compact, yet capable of fully achieving the intended object.

Preferably, the space-regulating element is provided as an element which can be buckled (i.e. crumple under pressure) between the press ring and the intermediate pressing element in response to the compressive force exceeding the predetermined value.

With the above construction, for releasing the space maintenance by the space-regulating element, the member which can be buckled by the reaction force from the elastic seal which has been compressed to the predetermined compressed condition is used. Therefore, the space-regulating element per se may readily be formed simple and compact, whereby the simplicity and compactness of the entire pipe connecting may be further promoted.

Specifically, the space-regulating element of the above type may comprise an element which is attached to the intermediate pressing element so as to extend axially from this intermediate pressing element toward the press ring.

With the above construction, the space-regulating element and the intermediate pressing element may be handled together as one component. As a result, the assembly of the pipe connecting apparatus may be carried out more efficiently and easily.

Preferably, the space-regulating element includes an engaging portion for coming into elastic axial engagement with an engaged portion in the inner peripheral face of the press ring so as to check a withdrawal movement of the retainer member interposed between the space-regulating element and the inner peripheral face of the press ring.

With the above construction, it is possible to assemble in advance, within the press ring, the retainer ring and the intermediate pressing element having the space-regulating element. In this manner, these plural components may be handled like one component. Accordingly, the efficiency and ease of the assembling operation of the pipe connecting apparatus may be further promoted.

Alternatively, the space-regulating element may comprise an element which can be sheared between the press ring and the intermediate pressing element in response to the compressive force exceeding the predetermined value.

This construction, in comparison with the foregoing buckled type construction, has the advantage that the necessary collapsing of the space-regulating element in association with the realization of the predetermined compressed condition of the elastic seal by the fastening operation may take place in a more sudden and conspicuous manner. As a result, the amount of deformation in the space-regulating element until the arrival of the elastic seal at the predetermined compressed condition may be reduced, so that the reliability of the space maintaining function may be improved.

Specifically, the space-regulating element of the above-described type may be a pair of annular cylindrical portions formed and connected integrally with each other and having different diameters so as to form a stepped cross section in the initial integrally connected state. The connecting portion between the cylindrical portions may be sheared in response to the compressive force exceeding the predetermined value so as to allow the two elements overlapped with each other in the radial direction.

With the above construction, when the elastic seal is rendered into the predetermined compressed condition with the fastening operation, the bordering portion, i.e. the connecting portion between the two annular cylindrical portions is sheared, so that the cylindrical portions will be moved one into the other in a telescopic manner. This causes the elastic diameter-reducing deformation of the retainer ring. In the case of this construction, the space-regulating element is provided as a cylindrical portion (made of a synthetic resin or the like) consisting of a plurality of cylindrical portions of different diameters to provide a stepped cross section. Thus, in this case too, this space-regulating element per se may readily formed simple and compact and the simplicity and compactness of the entire pipe connecting apparatus may be further promoted.

Still alternatively, the space-regulating element may include a projecting portion which projects from the intermediate pressing element in the radial direction, the projecting portion supporting the press ring in the first state, the projecting portion being sheared by the press ring in response to the compressive force exceeding the predetermined value.

More specifically, the press ring may include, in its inner peripheral face, an engaging groove consisting essentially of a first engaging groove into and from which the projecting portion is engageable and disengageable in the axial direction and a second engaging groove for preventing withdrawal of the projecting portion through relative rotation in the axial direction after insertion of the projecting portion into the first engaging groove.

According to the above construction, after the leading end of the space-regulating element retained to the intermediate pressing element into and along the first engaging groove of the engaging groove defined in the inner peripheral face of the press ring, the press ring and the intermediate pressing element will be rotated relative to each other about the pipe axis so as to engage the leading end of the space-regulating element into the second engaging groove, whereby the press ring and the intermediate pressing element may be connected with each other via the space-regulating element. In this manner, the assembly operation of the press ring and the intermediate pressing element may be carried out speedily and easily.

Preferably, the engaging groove includes a resistance providing means for providing resistance against the movement of the projecting so portion of the space-regulating element between the first engaging groove and the second engaging groove.

With the above construction, after the leading end of the space-regulating element has been engaged into the second engaging groove of the engaging groove, it is possible to restrict inadvertent displacement of this leading end toward the first engaging groove due to vibration or the like. So that, the assembly operation may be further facilitated.

More specifically, the space-regulating element may be a headed shear pin removably inserted into a radially extending through hole defined in the intermediate pressing element from the side of the outer peripheral face, with withdrawal of the shear pin from the through hole being prevented through abutment between the retainer member adjacent the intermediate pressing element and the head of the shear pin.

With the above construction, a commonly available shear pin may be employed as the space-regulating element, so that the total cost of the pipe connecting apparatus may be further reduced. In addition, a withdrawal movement of the shear pin inserted into the through hole of the intermediate pressing element from the side of the inner peripheral face may be prevented through utilization of the outer peripheral face of the retainer member engaged within the intermediate pressing element. In this manner, no special member dedicated to prevention of withdrawal of the shear pin is needed. As a result, the simplicity of the entire construction and the facility of the assembly operation may be further promoted.

Alternatively, the projecting portion may be a pin-like element extending integrally and radially from the outer peripheral face of the retainer member, the pin-like element being axially engageable with the press ring beyond the radially extending through hole defined in the intermediate pressing element.

With the above construction, the pin-like element constituting the space-regulating element and the retainer member may be handled as one integral component. Hence, the efficiency and facility of the assembly operation may be further promoted.

In the above construction, preferably, the retainer member comprises a pair of arcuate members which are joined together to present an annular configuration, the pin-like element extending integrally from an outer peripheral face of each said arcuate member.

Preferably, between the retainer member and the press ring, there is interposed a cam mechanism for rendering the retainer member into the locked condition in response to the relative axial movement between the retainer member and the press ring. With this construction, in the latter-half of the fastening operation, the retainer member will be radially pressed against the outer peripheral face of the second pipe member in association with the approaching movement of the press ring toward the elastic seal. Then, any axial displacement of the second pipe member relative to the first pipe member may be prevented reliably thereafter. Further, as the resilient force from the elastic seal too tends to push back the retainer member in the axial direction via the intermediate pressing element. As a result, the retainer member too, due to its cam face formed between the press ring, will be pressed against the outer peripheral face of the second pipe member. Also, the resilient force of the elastic seal tending to push back the retainer member in the axial direction will tend to enlarge the diameter of the press ring due to this function of the cam face, there will be realized an interlocked condition between the retainer member and the press ring due to static friction therebetween, so that the press ring too will be fixed temporarily.

Preferably, between the press ring and the first pipe member, there is interposed a fastener means for fastening the press ring to the elastic seal. Specifically, the fastener means comprises a flange defining a bolt-insertion hole and provided respectively to the press ring and the first pipe member.

Preferably, the retainer member comprises a retainer ring having a C-shaped configuration as seen in the axial direction and deformable in a diameter-reducing direction, the retainer ring having an inner diameter which is larger under a zero-load condition than the outer diameter of the insertion pipe potion.

With the above construction, the inserting operation of the insertion pipe portion into the retainer ring may be carried out easily. So that, the efficiency of the assembly operation of the pipe connecting apparatus may be further improved.

Further and other objects, features and advantages of the invention will become apparent from the following detailed description of the preferred embodiments thereof with reference to the accompanying drawings.

DESCRIPTION OF THE PREFERRED EMBODIMENTS

Figure 1:
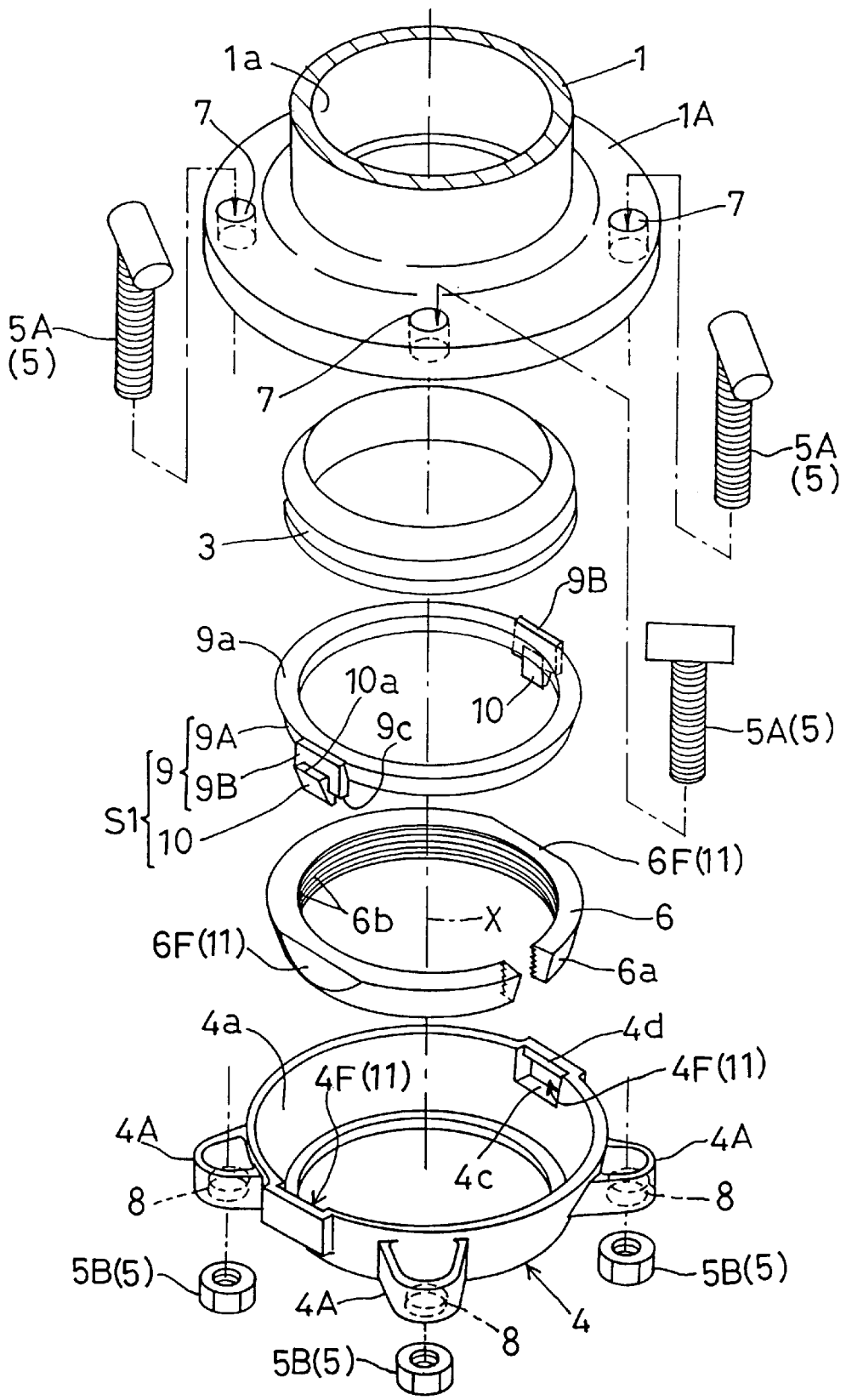
FIG. 1 is an exploded perspective view showing a principal portion of a pipe connecting apparatus according to a first embodiment of the present invention, FIG. 2 are side views in section showing the apparatus of FIG. 1 before and after assembly thereof, respectively.
Figure 2:
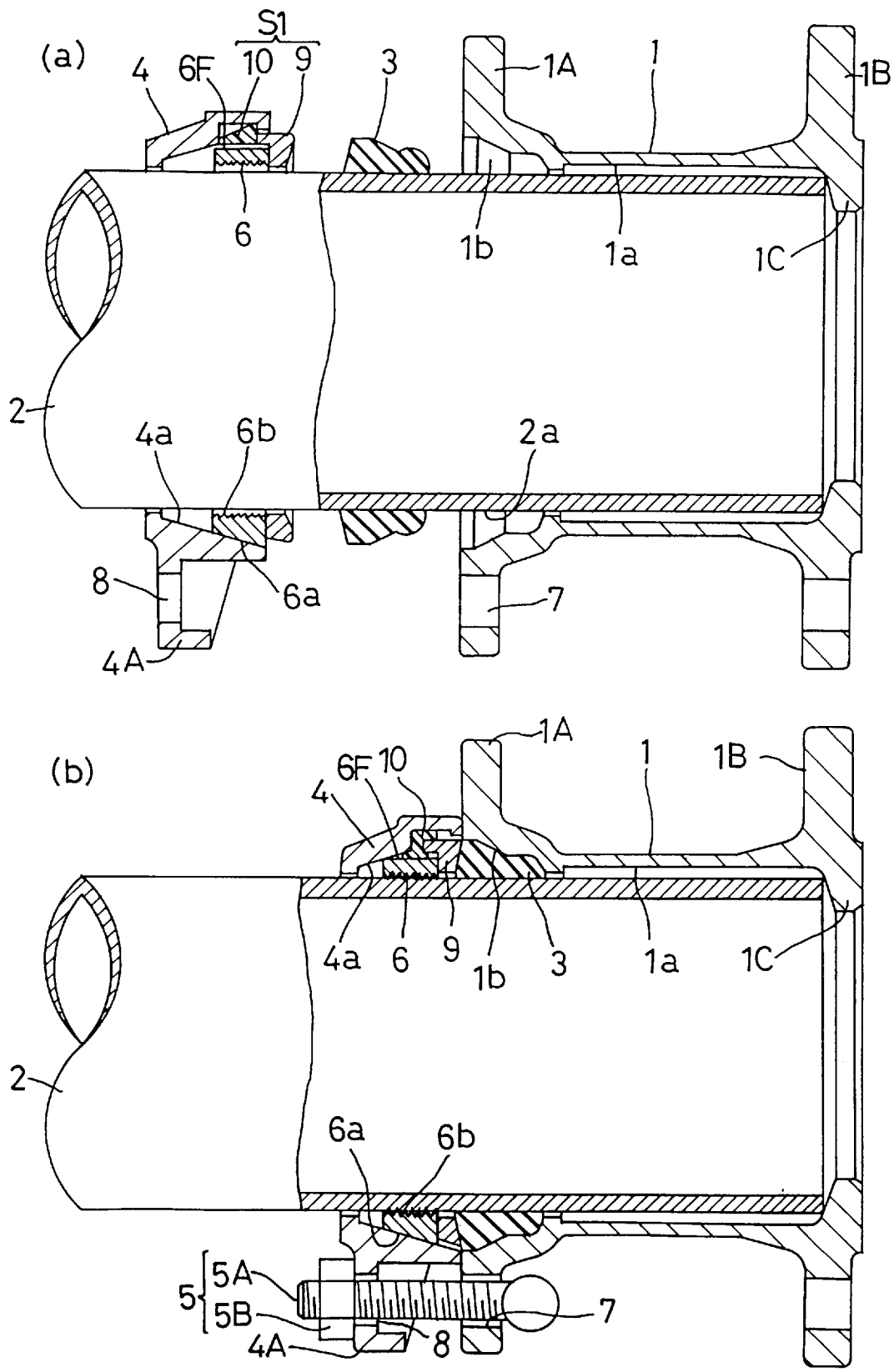
Figure 3:
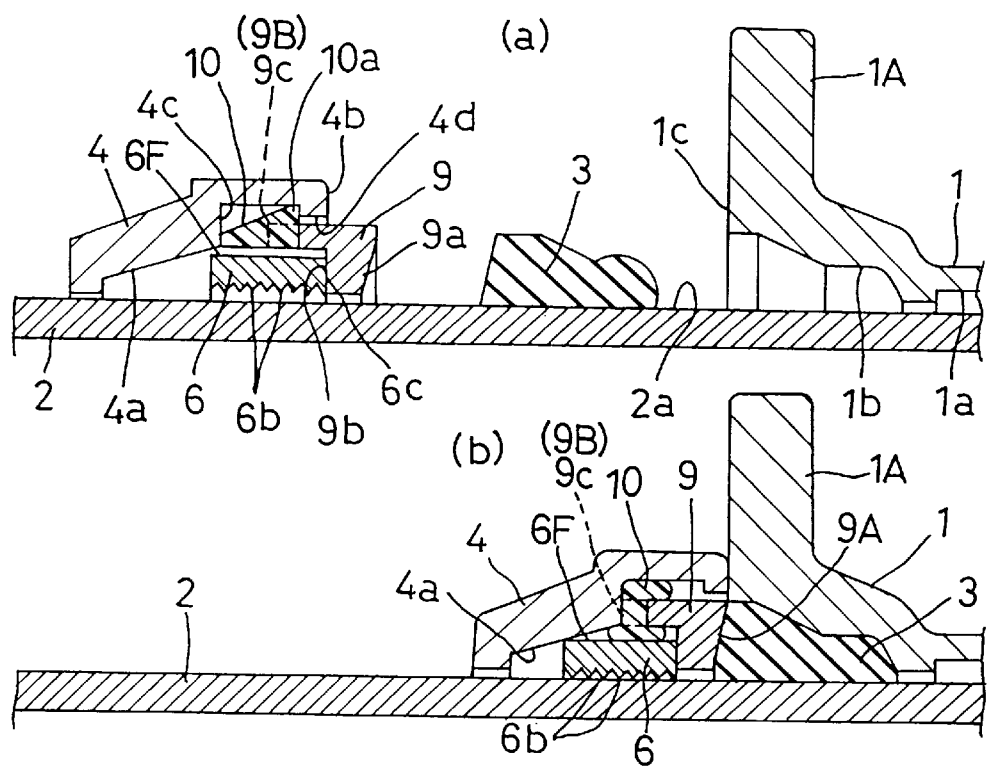
FIG. 3 is an enlarged sectional side view of the principal portion of FIG. 2.

FIGS. 1–3 show a pie connecting apparatus for a fluid transport pipe system (e.g. for water pipe). In this apparatus, an insertion pipe portion 2 made of synthetic resin is inserted into and connected with a receiver pipe portion 1 made of cast iron. Over this insertion pipe portion 2, there are fitted an elastic seal 3 made of synthetic rubber (e.g. styrene-butadiene rubber) capable of sealing a gap formed between an inner peripheral face 1a of the receiver pipe portion 1 and an outer peripheral face 2a of the insertion pipe portion 1 and a press ring 4 made of cast iron capable of compressing the elastic seal in a pipe axial direction X into a sealed (water-tight) condition. Further, a fastener means 5 is provided for fastening the press ring 4 with the receiver pipe portion 1 in the axial direction X. Between the outer peripheral face 2a of the insertion pipe portion 2 and an inner peripheral face 4a of the press ring 4, there is disposed a retainer ring 6 made of synthetic resin such as polyacetal or metal such as stainless steel. This retainer ring 6 is capable of elastic deformation in a diameter-reducing direction to bite into the outer peripheral face 2a of the insertion pipe portion 2 with a mutually approaching movement between the press ring 4 and the receiver pipe portion 1 in association with a fastening operation of the fastener means 5. Further, between the elastic seal 3 and the press ring 4 and the retainer ring 6 which are opposed to the seal 3 in the axial direction X, there is provided a sequentially operative mechanism S1 which is operative to press the elastic seal 3 alone in the axial direction during a former half of the fastening operation of the fastener means 5 and also to allow the retainer ring 6 to be elastically deformed in the diameter-reducing direction to such a degree as to bite into the outer peripheral face of the insertion pipe portion 2 against the resilient force thereof during a latter half of the fastening operation of the retainer ring after the elastic seal 3 has been compressed into a predetermined compressed condition.

The receiver pipe portion 1 integrally forms a first connecting flange 1A provided at one end the pipe portion 1 and defining a plurality of bolt-insertion holes 7 for the connection with the press ring 4 at a plurality of peripheral portions (four positions in this embodiment) thereof, a second connecting flange 1B provided at the other end of the pipe portion 1 to be fixedly connected by means of bolts and nuts with another fluid pipe device such as a fluid transport pipe (e.g. water pipe) or a sluice valve, and an annular projection 1C which comes into contact with a leading end of the inserted insertion pipe portion 2 in the axial direction X. Further, adjacent an axial end of the inner peripheral face 1a of the receiver pipe portion 1, there is formed a seal retaining portion 1b which can removably retain the elastic seal 3 in the axial direction X. This seal retaining portion 1b has a tapered cross section whose opening diameter increases toward the axial end.

The press ring 4 integrally forms in the outer peripheral face thereof a plurality of connecting projections 4A at a plurality of peripheral portions (four portions in this embodiment) in an outer peripheral face thereof. Each connecting projection 4A defines a bolt-insertion hole 8 for connection with the first connecting flange 1A of the receiver pipe portion 1. Further, an inner peripheral face 4a of this press ring 4 is provided as a tapered face having a predetermined direction. Then, when the receiver pipe portion 1 and the insertion pipe portion 2 tend to move in the withdrawing direction due to some external force (e.g. a tensile force resulting from an earthquake, a differential settlement or the like), the tapered face comes into abutment against an outer peripheral face 6a of the retainer ring 6 which has already bitten to a certain extent into the outer peripheral face 2a of the insertion pipe portion 2, so that the face deforms the ring 6 in the diameter-reducing direction to cause the ring 6 to bite further into the outer peripheral face 2a of the insertion pipe portion 2.

The retainer ring 6 has an inner diameter which is larger, in a non-radially reduced state, i.e. when no external force is applied thereto, than the outer diameter of the insertion pipe portion 2. Further, the outer peripheral face 6a of this retainer ring 6, except for two peripheral portions thereof where flat cut faces 6F are formed, is provided as a tapered face having the same indication as that of the inner peripheral face 4a of the press ring 4. In addition, in the inner peripheral face of this retainer ring 6, there are formed sharp-edged retaining projections capable of radially biting into the outer peripheral face 2a of the insertion pipe portion 2.

The fastener means 5 consists of T-shaped bolts 5A inserted through the bolt-insertion holes 7 defined in the first connecting flange 1A of the receiver pipe portion 1 and also through the bolt-insertion holes 8 defined in the connecting projections 4A of the press ring 4 and nuts 5B therefor.

The sequentially operative means S1 includes an intermediate pressing element 9 in the form of a circular ring to be pressed against the elastic seal 3 with a displacement of the press ring 4 relative to the receiver pipe portion 1 and a space-regulating element 10 interposed between the press ring 4 and the intermediate pressing element 9 along the axial direction X. The intermediate pressing element 9 is made of metal such as stainless steel or synthetic resin. On the other hand, the space-regulating element 10 is made of synthetic resin such as urethane which can be buckled and collapsed under a reaction force from the elastic seal 3 which has been rendered into the predetermined compressed condition with the fastening operation of the fastener means 5.

In association with the fastening operation by the fastener means 5, the press ring 4 will be moved along the axial direction X toward the receiver pipe portion 1, so that the press ring 4 and the space-regulating element 10, the space-regulating element 10 and the intermediate pressing element 9, and the intermediate pressing element 9 and the elastic seal 3 retained within the seal retaining portion 1b come into abutment against each other, respectively. With this, first, the fastening force from the fastener means 5 will be transmitted via the press ring 4 to the space-regulating element 10. Then, this fastening force is transmitted via the space-regulating element 10 which still substantially maintains its original condition without any external force applied thereto to the intermediate pressing element 9, which then presses, in turn, the elastic seal 3 (at this stage, the retainer ring 6 has not yet been deformed in the diameter-reducing direction and still retains its initial large-diameter form). Thereafter, when the fastening force from the fastener means 5 further increases, as illustrated in FIG. 2(b), the space-regulating element 10 will be collapsed through its buckling deformation due to the reaction force from the elastic seal 3. In succession, due to the cam function between the tapered outer peripheral face 6a of the retainer ring 6 and the tapered inner peripheral face 4a of the press ring 4, the retainer ring 6 will be deformed and reduced in its diameter despite of its elastic resilience, so that the ring 6 will bite into the outer peripheral face 2a of the insertion pipe portion 2 in the radial direction.

In other words, until the elastic seal 3 reaches a predetermined compressed condition, the space-regulating element 10 serves to maintain the opposing distance in the axial direction X between the intermediate pressing element 9 and the press ring 4 at such a distance that doe not cause the diameter-reducing deformation of the retainer ring 6. Also, when the elastic seal 3 has reached the predetermined compressed condition, the element 10 releases the space maintenance function through its own buckling deformation.

The intermediate pressing element 9 includes a seal pressing face 9a for pressing the elastic seal 3 along the axial direction X and a ring pressing face 9b for pressing an end face 6c in the axial direction X of the retainer ring 6 toward the tapered inner peripheral face 4a of the press ring 4. Further, as shown in FIG. 1 and FIG. 3(a), in the outer peripheral face 9A of the intermediate pressing element 9 and at two portions thereof peripherally displaced by 180 degrees from each other, there are integrally formed a pair of plate-like pressure-receiving portions 9B projecting therefrom. When the fastener means 6 has been fastened to the maximum extent, that is, when the one end face 4b in the axial direction X of the press ring 4 has come into abutment against the one end face 1c in the axial direction X of the receiver pipe portion 1, a receiving face 9c formed in each pressure-receiving portion 9B abuts a pressing face 4c formed in the inner peripheral face 4a of the press ring 4 in the axial direction X.

Moreover, to each pressure-receiving portion 9B, the space-regulating element 10 made of synthetic resin is fixed by means of an adhesive agent or the like, with the element 10 projecting toward the pressing face 4c of the press ring 4.

Between the tapered outer peripheral face 6a of the retainer ring 6 and the tapered inner peripheral face 4a of the press ring 4, there is provided an attachment positioning means 11 which allows attachment and detachment of the pressure-receiving portions 9B of the intermediate pressing element 9 in the axial direction X and which also restricts relative rotational displacement among the press ring 4, the retainer ring 6 and the intermediate pressing element 9 when the intermediate press element 9 has been engaged between the tapered outer peripheral face 6a of the retainer ring 6 and the tapered inner peripheral face 4a of the press ring 4.

This attachment positioning means 11 consists essentially of the flat cut faces 6F (extending substantially parallel with the axial direction X) formed at the two peripheral portions in the tapered outer peripheral face 6a of the retainer ring 6 in the vicinity of the inner peripheral face of the two pressure-receiving portions 9B of the intermediate pressing element 9 and of groove portions 4F formed at two peripheral portions in the inner peripheral face 4a of the press ring 4 and engaged with the outer peripheral faces of the pressure-receiving portions 9B of the intermediate pressing element 9.

Further, referring to the press ring 4, its end face 4c facing the groove portions 4F as the positioning means 11 functions as a pressing face for pressing the leading end face of the space-regulating element 10 made of synthetic resin. However, once this space-regulating element 10 has collapsed through its own buckling deformation, the end face 4c comes into abutment against the receiving face 9c of the intermediate pressing element 9.

Further, the space-regulating element 10 includes an engaging portion 10a which comes into elastic engagement along the axial direction X with an engaged portion 4d formed at an end portion in the inner peripheral face of the press ring 4 facing the groove portion 4F as the positioning means 11 so as to prevent inadvertent withdrawal of the retainer ring 6 fitted between the space-regulating element 10 and the inner peripheral face of the press ring 4.

According to the above-described construction, when the bolts 5A and nuts 5B of the fastener means 5 are fastened with the insertion pipe portion 2 being inserted into the receiver pipe portion 1 by a predetermined length, in the former half of this fastening operation, the pressing face 4c of the press ring 4 moving closer to the receiver pipe portion 1 will come into abutment against the leading end face of the space-regulating element 10 made of synthetic resin and fixedly attached to the intermediate pressing element 9, and this moving force of the press ring 4 will be transmitted as a pressing force in the axial direction X via the space-regulating element 9 and the intermediate pressing element 9 to the elastic seal 3. As a result, the elastic seal 8 is elastically compressed to reliably seal the gap formed between the inner peripheral face 1a of the receiver pipe portion 1 and the outer peripheral face 2a of the insertion pipe portion 2.

In the former half of the fastening operation described above, i.e. until the elastic seal 3 reaches the predetermined compressed condition, the opposing distance in the axial direction X between the intermediate pressing element 9 and the press ring 4 is maintained at the predetermined distance by means of the space-regulating element 10 affixed to the intermediate pressing element 9. So that, the retainer ring 6 is maintained at its original non-reduced (i.e. the large-diameter) state.

Thereafter, in the latter half of the fastening operation, i.e. after the elastic seal 3 has reached the predetermined compressed condition, the space-regulating element 10 made of synthetic resin will collapse due to its own buckling deformation, so as to release its space maintaining function. With subsequent fastening operation of the fastener means, the buckling deformation of the space-regulating element 10 will be further developed, whereby the intermediate pressing element 9 and the press ring 4 begin to move closer to each other along the axial direction X. In association with this mutually approaching movement, the retainer ring 6 will be deformed in the diameter-reducing direction against its own elastic resilience. Due to the cam function between the tapered outer peripheral face 6a of the retainer ring 6 and the tapered inner peripheral face 4a of the press ring 4, the inner peripheral face 4a of the press ring 4 will radially compress the retainer ring 6 to cause its retaining projections 6b to bite into the outer peripheral face 2a of the insertion pipe portion 2.

Incidentally, the space-regulating element 10, in association with its own collapsing deformation, will be forced into the gap between the inner peripheral faces of the pressure-receiving portions 9B of the intermediate pressing element 9 and the cut faces 6F of the retainer ring 6 as well as the gap between the outer peripheral faces of the pressure-receiving portions 9B of the intermediate pressing element 9 and the inner faces of the groove portions 4F of the press ring 4.

(Modification of the First Embodiment)

The amount of engagement and matching engagement shape between the engaging portion 10a of the space-regulating element 10 and the engaged portion 4d of the press ring 4 may be modified in any way as long as such modification still enables un-withdrawable retention of the space-regulating element 10 within the press ring 4 while allowing insertion and withdrawal of the space-regulating element 10 to and from the press ring 4 along the axial direction X.

In the first embodiment described above, the space-regulating element 10 is affixed to the intermediate pressing element 9 by means of an adhesive agent or the like. Instead, this space-regulating element 10 may be engaged and retained to the intermediate pressing element 9.

(Second Embodiment)

Figure 4:
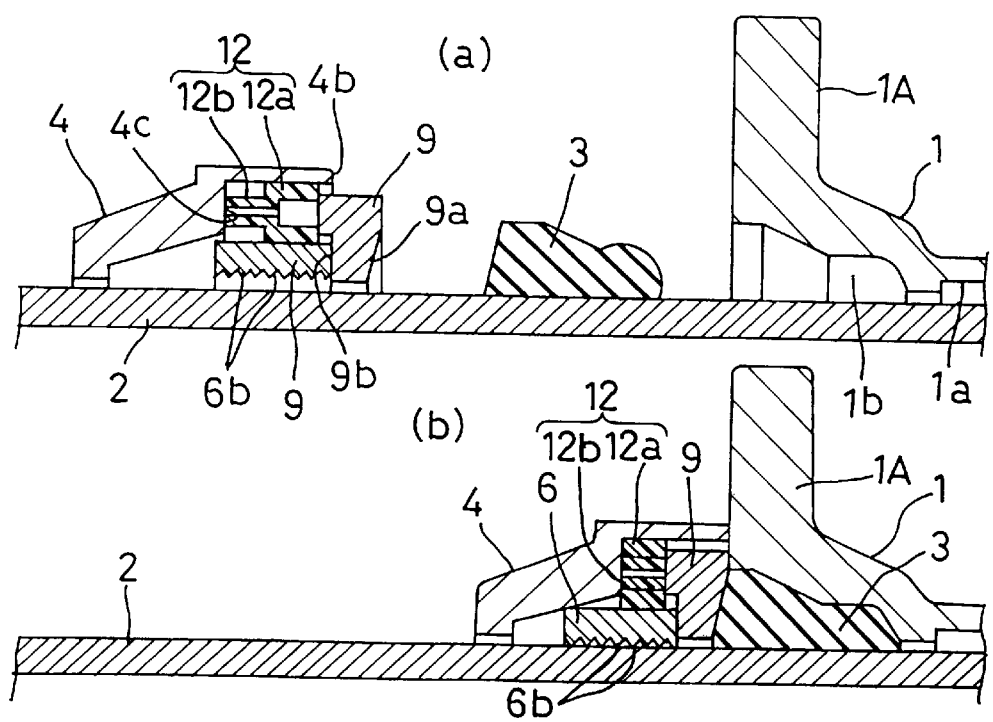
FIG. 4 is an enlarged sectional side view of a pipe connecting apparatus according to a second embodiment of the present invention before and after assembly thereof respectively.
Figure 5:
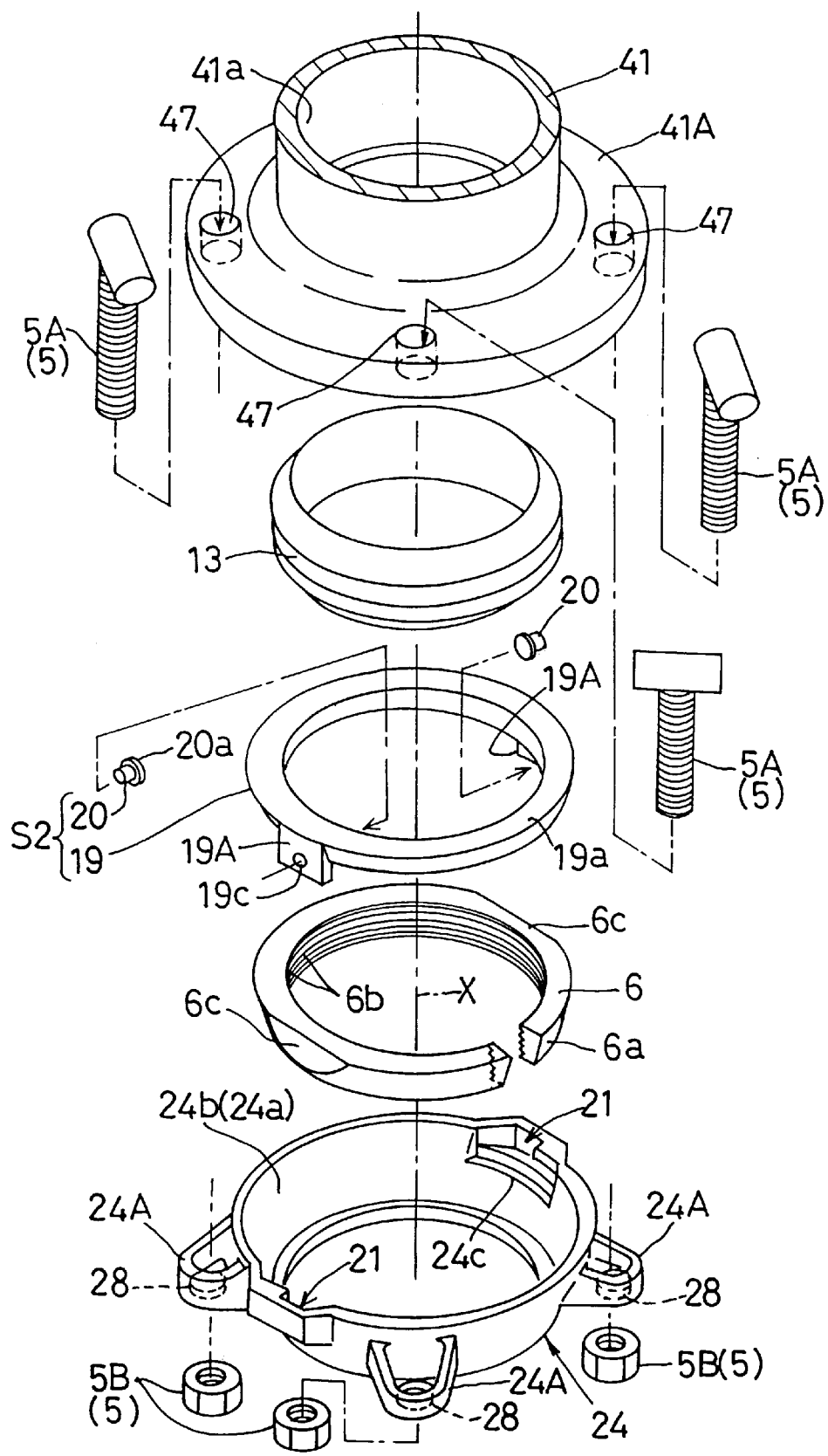
FIG. 5 is an exploded perspective showing a principal portion of a pipe connecting apparatus according to a third embodiment of the present invention, FIG. 6 are side views in section showing the apparatus of FIG. 5 before and after assembly thereof, respectively, FIG. 7 are enlarged sectional side views of the principal portion of the apparatus of FIG. 5 before, during and after assembly thereof, respectively.
Figure 6:
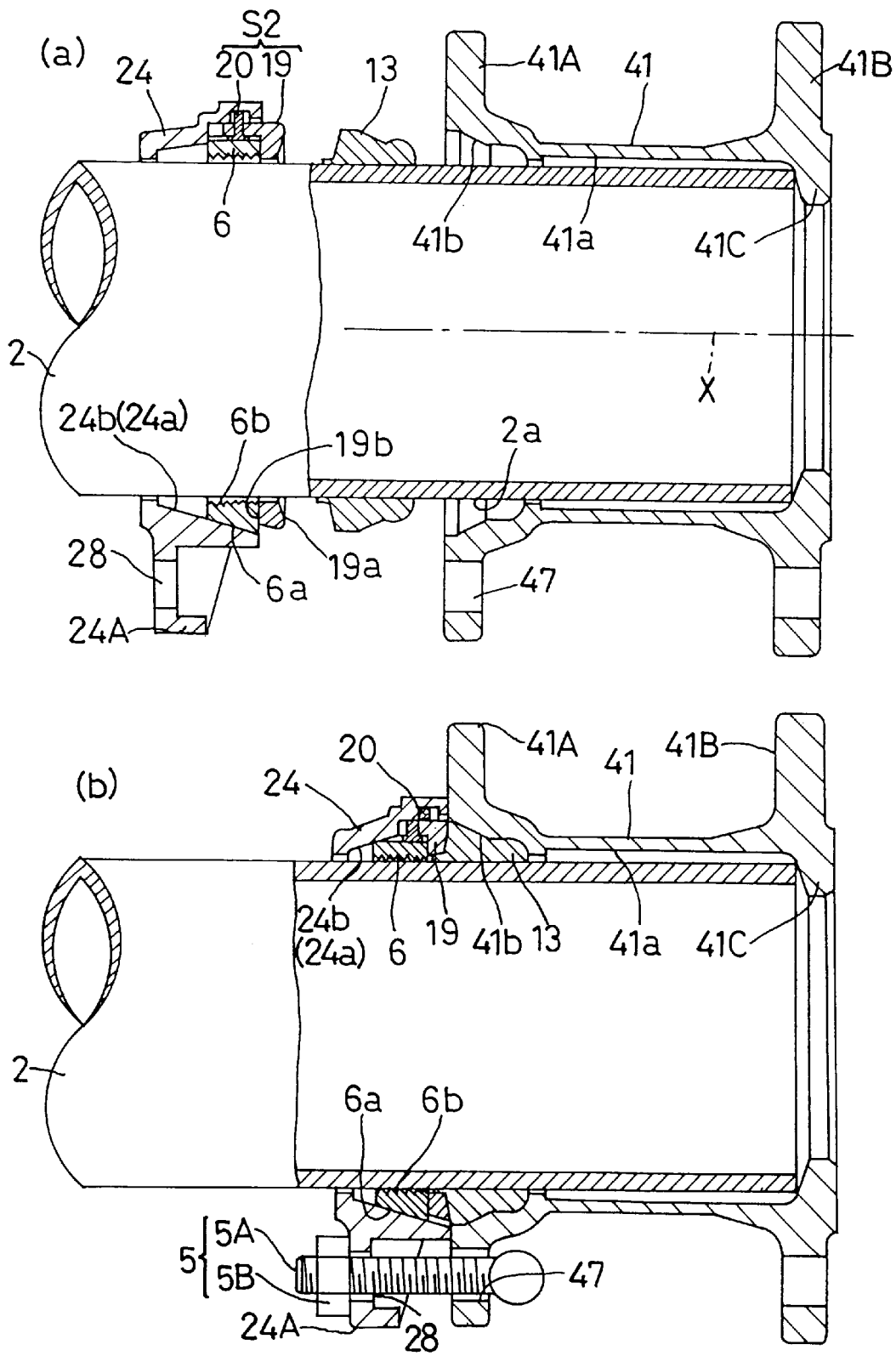
Figure 7:
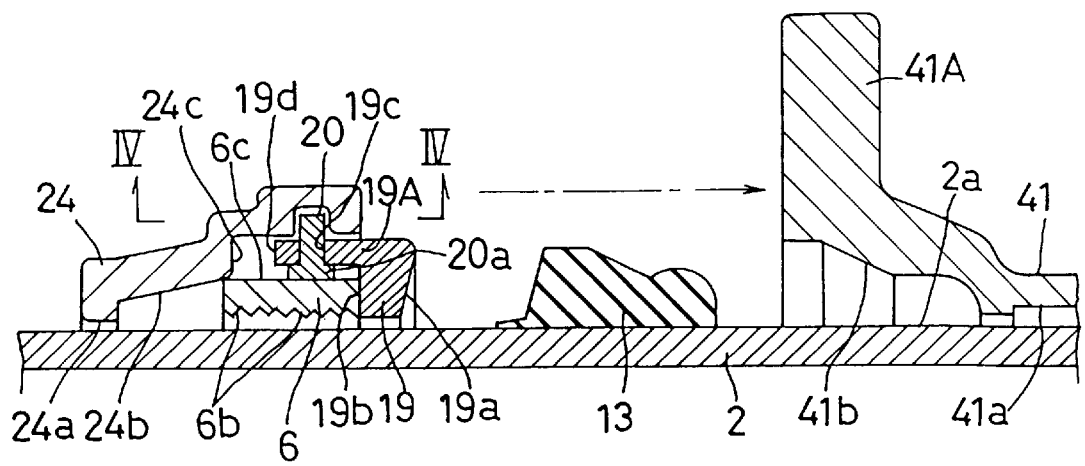
Figure 7:
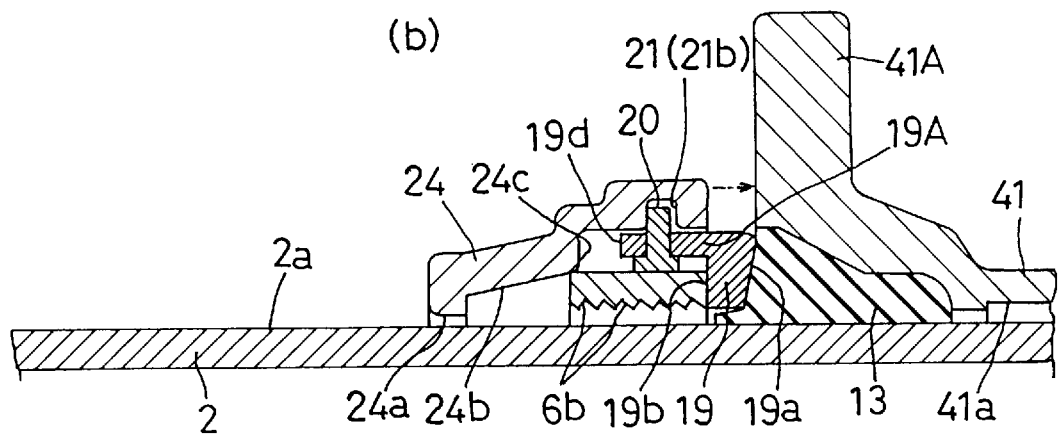
Figure 7:
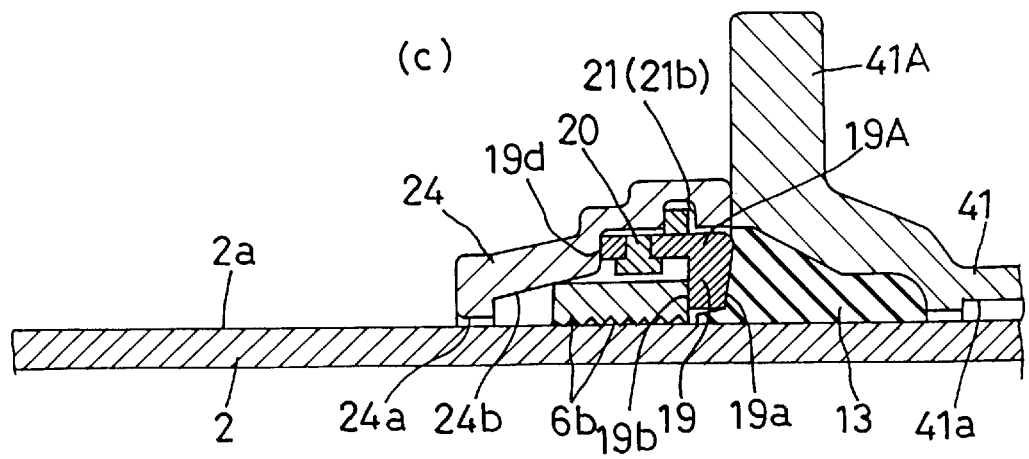
Figure 8:
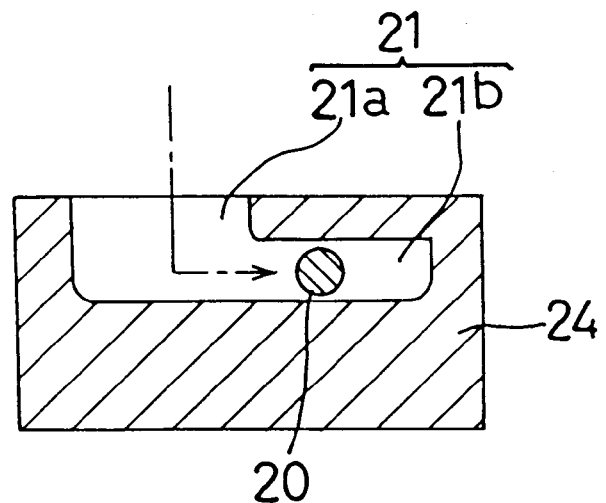
FIG. 8 is an enlarged section view taken along a line IV—IV in FIG. 7(a)

FIG. 4 shows a pipe connecting apparatus according to a second embodiment of the present invention. A space-regulating element 12 employed in this embodiment presents as a whole an annular configuration. However, as shown in FIG. 4(a), this element 12 has a stepped cross section consisting of a plurality (two in this particular embodiment) of cylindrical portions 12a, 12b of differing inner and outer diameters integrally interconnected with each other in the axial direction X. When the elastic seal 3 reaches the predetermined compressed condition by the fastening operation of the bolts 5A and nuts 5B of the fastener means 5, the reaction force from the elastic compression of the elastic seal 3 will break or shear the interconnecting portions between the plurality of cylindrical portions 12a, 12b. So that, as shown in FIG. 4(b), the small-diameter cylindrical portion 12b will be telescopically moved into the hollow inner space of the large-diameter cylindrical portion 12a. With this deformation accompanied by shearing, the space maintenance will be released. In succession, in association with the telescopically contracting movement between the cylindrical portions 12a, 12b, the retainer ring 6 will be compressed in its diameter against its own resilience, so that the retaining projections 6b of the retainer ring 6 will bite into the outer peripheral face 2a of the insertion pipe portion 2.

Except for the space-regulating element 12 described above, the rest of the construction of this second embodiment is same as that of the first embodiment described hereinbefore. Therefore, those same components are denoted with the same reference marks or numerals in FIG. 4 and these will not be described here in repetition.

(Third Embodiment)

FIGS. 5–8 show a pipe connecting apparatus for a fluid transport pipe system (e.g. for water pipe). In this apparatus, an insertion pipe portion 2 made of synthetic resin is inserted into and connected with a receiver pipe portion 41 made of cast iron. Over this insertion pipe portion 2, there are fitted an elastic seal 13 made of synthetic rubber (e.g. styrene-butadiene rubber) capable of sealing a gap formed between an inner peripheral face 41a of the receiver pipe portion 41 and an outer peripheral face 2a of the insertion pipe portion 2 and a press ring 24 made of cast iron capable of compressing the elastic seal in a pipe axial direction X into a sealed (water-tight) condition. Further, a fastener means 5 is provided for fastening the press ring 24 with the receiver pipe portion 41 in the axial direction X. Between the outer peripheral face 2a of the insertion pipe portion 2 and an inner peripheral face 24a of the press ring 24, there is disposed a retainer ring 6 made of synthetic resin such as polyacetal or metal such as stainless steel. This retainer ring 6 having a substantially C-shaped configuration, is capable of elastic deformation in a diameter-reducing direction to bite into the outer peripheral face 2a of the insertion pipe portion 2.

Further, in the inner peripheral face 24a of the press ring 24, there is formed a tapered cam face 24b for elastically deforming the retainer ring 6 in the diameter-reducing direction with a mutually approaching movement between the press ring 24 and the receiver pipe portion 41 in association with a fastening operation of the fastener means 5. Further, between the elastic seal 13 and the press ring 24 and the retainer ring 6 which are opposed to the seal 3 in the axial direction X, there is provided a sequentially operative mechanism S2 which is operative to press the elastic seal 13 alone in the axial direction during a former half of the fastening operation of the fastener means 5 and also to allow the retainer ring 6 to be elastically deformed in the diameter-reducing direction against the resilient force thereof during a latter half of the fastening operation of the retainer ring 6 after the elastic seal 13 has been compressed into a predetermined compressed condition.

The receiver pipe portion 41 integrally forms a first connecting flange 41A provided at one end the pipe portion 41 and defining a plurality of bolt-insertion holes 47 for the connection with the press ring 24 at a plurality of peripheral portions (four positions in this embodiment) thereof, a second connecting flange 41B provided at the other end of the pipe portion 41 to be fixedly connected by means of bolts and nuts with another fluid pipe device such as a fluid transport pipe (e.g. water pipe) or a sluice valve, and an annular projection 41C which comes into contact with a leading end of the inserted insertion pipe portion 2 in the axial direction X. Further, adjacent an axial end of the inner peripheral face 41a of the receiver pipe portion 41, there is formed a seal retaining portion 41b which can removably retain the elastic seal 13 in the axial direction X. This seal retaining portion 41b has a tapered cross section whose opening diameter increases toward the axial end.

The press ring 24 integrally forms in the outer peripheral face thereof a plurality of connecting projections 24A at a plurality of peripheral portions (four portions in this embodiment) in an outer peripheral face thereof. Each connecting projection 24A defines a bolt-insertion hole 28 for connection with the first connecting flange 41A of the receiver pipe portion 41. Further, a cam face 24b of this press ring 24 is constructed such that when the receiver pipe portion 41 and the insertion pipe portion 2 tend to move in the withdrawing direction due to some external force (e.g. a tensile force resulting from an earthquake, a differential settlement or the like), the cam face comes into abutment against an outer peripheral face 6a of the retainer ring 6 which has already bitten to a certain extent into the outer peripheral face 2a of the insertion pipe portion 2, so that the face deforms the ring 6 in the diameter-reducing direction to cause the ring 6 to bite further into the outer peripheral face 2a of the insertion pipe portion 2.

The retainer ring 6 has an inner diameter which is larger, in a non-radially reduced state, i.e. when no external force is applied thereto, than the outer diameter of the insertion pipe portion 2. Further, the outer peripheral face 6a of this retainer ring 6 is provided as a tapered face having the same inclination as that of the tapered cam face 24b of the press ring 24. In addition, in the inner peripheral face of this retainer ring 6, there are formed sharp-edged retaining projections 6b capable of radially biting into the outer peripheral face 2a of the insertion pipe portion 2.

The fastener means 5 consists of T-shaped bolts 5A inserted through the bolt-insertion holes 47 defined in the first connecting flange 41A of the receiver pipe portion 41 and also through the bolt-insertion holes 28 defined in opposition thereto in the connecting projections 24A of the press ring 24 and nuts 5B therefor.

The sequentially operative means S2 includes an intermediate pressing element 19 in the form of a circular ring made of metal such as stainless steel or synthetic resin. The intermediate pressing element 19 has a first pressing face 19a for compressing the elastic seal 13 along the axial direction X with a mutually approaching displacement between the press ring 24 and the receiver pipe portion 41 and a second pressing face 19b capable of compressing the retainer ring 6 along the axial direction X toward the cam face 24b of the press ring 24. The sequentially operative means S2 further includes a space-regulating element 20 extending along mutually radially opposing or substantially opposing portions of the intermediate pressing element 19 and the press ring 24. This space-regulating element 20 functions to maintain the opposing space along the axial direction X between the cam face 24b of the press ring 24 and the second pressing face 19b of the intermediate pressing element 19 within such a range as not to elastically deform the retainer ring 6 in the diameter-reducing direction which ring is maintained under a non-biting state until the elastic seal 13 reaches the predetermined compressed condition in association with the mutually approaching movement between the press ring 24 and the receiver pipe portion 41. When the elastic seal 13 has reached the predetermined compressed condition, the space-regulating element 20 is sheared between the outer peripheral face of the intermediate pressing element 19 and the inner peripheral face of the press ring 24 so as to release its space maintaining state, i.e. to allow the mutually approaching movement in the axial direction X between the cam face 24b of the press ring 24 and the second pressing fare 19b of the intermediate pressing element 19.

Further, in the outer peripheral face of the intermediate pressing element 19 and at each of two portions thereof peripherally offset from each other by 180 degrees, there is formed a brim portion 19A which comes along the axial direction X into the gap between the inner peripheral face 24a of the press ring 24 and the outer peripheral face 6a of the retainer ring 6. Each brim portion 19A defines a radially extending through hole 19c into which a headed shear pin made of an aluminum alloy and constituting the space-regulating element 20 is removably inserted from the side of the inner peripheral face. Moreover, a leading end face 19d of each brim portion 19A is adapted to come into abutment, along the axial direction X, against a stopper face 24c formed at an inner portion of the inner peripheral face 24a of the press ring 24.

In the tapered outer peripheral face 6a of the retainer ring 6 and at portions thereof radially opposing respectively to the brim portions 19A, there are formed flat faces 6c opposing substantially parallel to each other with a space therebetween slightly larger than the thickness of a head portion 20a of the shear pin 20, so that the flat faces function as attachment positioning means for allowing engagement along the axial direction X between the retainer ring 6 and the intermediate pressing element 19 only when these members are held under a predetermined phase relationship relative to each other. Further, any withdrawal movement of the shear pin 20 inserted from the side of the inner peripheral face into the through holes 19c of the brim portions 19A of the intermediate pressing element 19 may be effectively checked through abutment thereof with the flat faces 6c of the retainer ring 6 inwardly engaged with the brim portions 19A of the intermediate pressing element 19.

Further, in the inner peripheral face 24a of the press ring 24 and at portions thereof radially opposing to the brim portions 19A of the intermediate pressing element 19, there are formed engaging grooves 21, each of which includes a first engaging groove portion 21a into which the leading end of the shear pin 20 inserted into the through hole 19c of the brim portion 19A is removably engageable and a second engaging groove portion 21b into which prevents withdrawal movement of the leading end of the shear pin 20 along the axial direction X through relative rotation about the axis X with the leading end of the shear pin 20 being located at a predetermined position inside the first engaging groove portion 21a.

In operation, when the bolts 5A and the nuts 5B of the fastener means 5 are fastened with the insertion pipe portion 2 being inserted into the receiver pipe portion 41 by a predetermined set length, the press ring 41 and the receiver pipe portion 41 are moved closer to each other in association with this fasting operation. In the course of this, since the shear pins 20 which are inserted from the side of the inner peripheral face into the through holes 19c of the opposed brim portions 19A of the press ring 24 and whose leading ends are engaged within the second engaging groove portions 21b of the engaging grooves 21 defined in the inner peripheral face 24a of the press ring 24 are maintaining the opposing distance between the cam face 24b of the press ring 24 and the second pressing face 19b of the intermediate pressing element at the predetermined distance, the retainer ring 6 is maintained not to bite into the outer peripheral face 2a of the insertion pipe portion 2, whereas the elastic seal 13 alone will be compressed along the axial direction X via the first pressing face 19a of the intermediate pressing element 19, so that this compressed elastic seal 13 may reliably seal the gap between the inner peripheral face 41a of the receiver pipe portion 41 and the outer peripheral face 2a of the insertion pipe portion 2.

Then, when the elastic seal 13 reaches the predetermined compressed condition, the shear pins 20 will be sheared by the reaction force therefrom between the outer peripheral face of the intermediate pressing element 19 and the inner peripheral face 24a of the press ring 24, so that the shear pins release their space maintaining condition. Thus, in association with a subsequent fastening operation of the fastener means 5, the second pressing face 19b of the intermediate pressing element 19 and the cam face 24b of the press ring 24 will be moved closer to each other, in association with which the retainer ring 6 will elastically deformed in the diameter-reducing direction to bite into the outer peripheral face 2a of the insertion pipe portion 2.

(Modification of the Third Embodiment)

Figure 9:
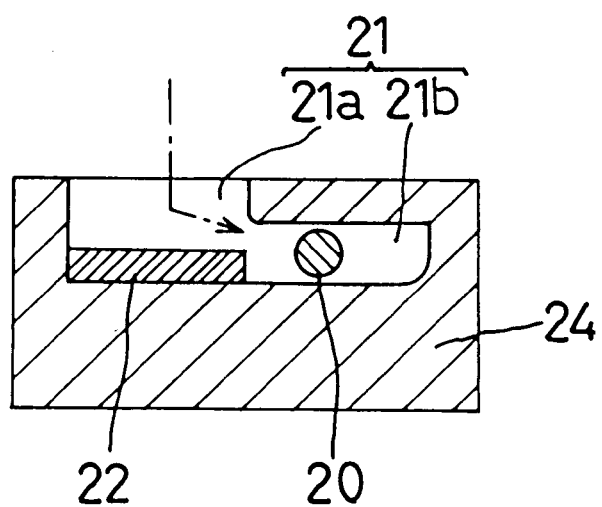
FIG. 9 is an enlarged sectional view corresponding to FIG. 7 showing a modified construction of the third embodiment.

FIG. 9 shows a modification of the engaging groove 21 of the pipe connecting apparatus described above in the third embodiment. In this modified construction, at the communicating portion between the first engaging groove portion 21a and the second engaging groove portion 21b of the engaging groove 21, a resistance providing means 22 is provided for providing resistance against the movement of the leading end of the shear pin 20 constituting the space-regulating element.

This resistance providing means 22 is formed of synthetic rubber (e.g. styrene-butadiene rubber). In operation, when elastically deformed by the pressing force from the leading end of the shear pin 20, the resistance providing means 22 allows passage of the leading end of the shear pin 20. Whereas, when the resistance providing means 22 is not subjected to a pressing force exceeding a predetermined magnitude, this prevents movement of the leading end of the shear pin 20 toward the first engaging groove portion 21a.

Except for the resistance providing means 22 described above, the rest of the construction of this modified embodiment is same as that of the third embodiment described hereinbefore. Therefore, those same components are denoted with the same reference marks or numerals in FIG. 9 and these will not be described here in repetition.

(Fourth Embodiment)

Figure 10:
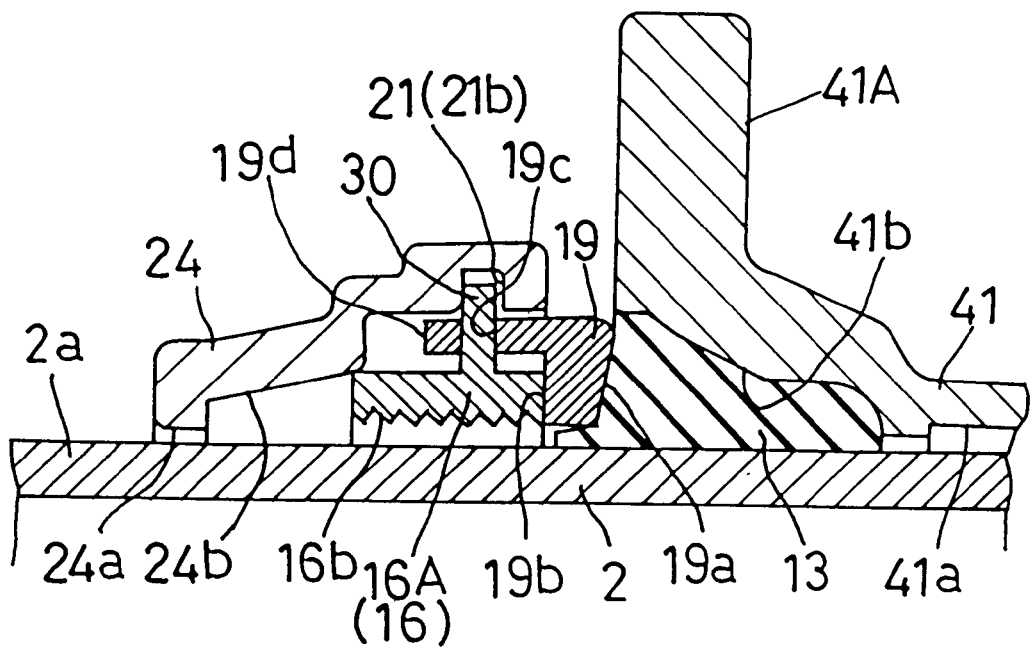
FIG 10 is an enlarged sectional side view showing a principal portion relating to a fourth embodiment.
Figure 11:
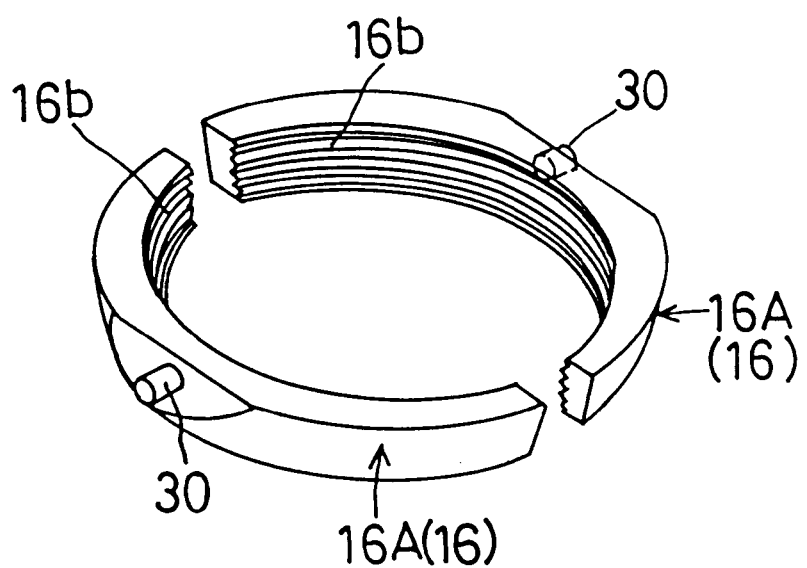
FIG. 11 is a perspective view of a retainer ring relating to the fourth embodiment.
Figure 12:
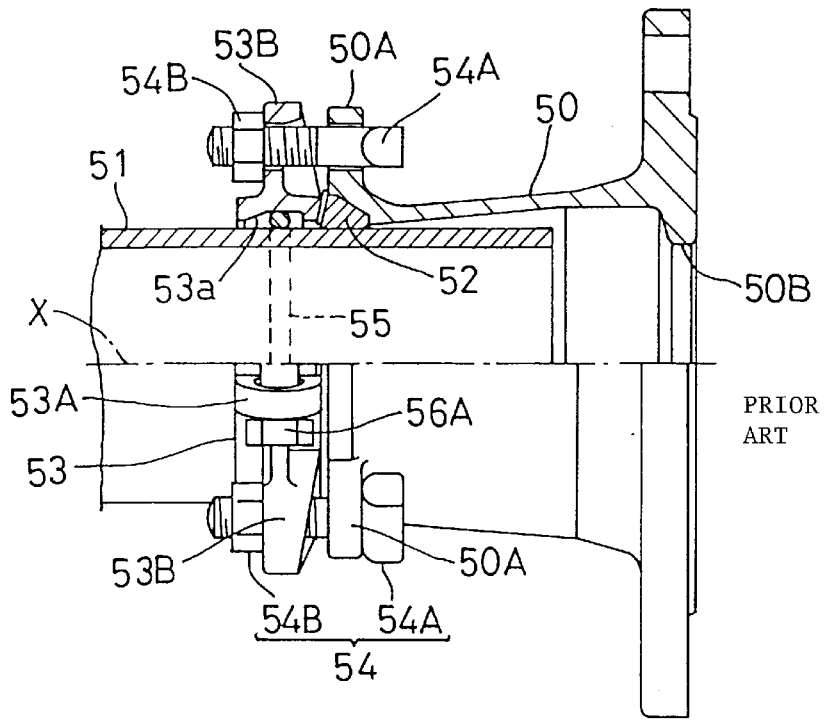
FIG. 12 is a partially cutaway side view showing a conventional pipe connecting apparatus.
Figure 13:
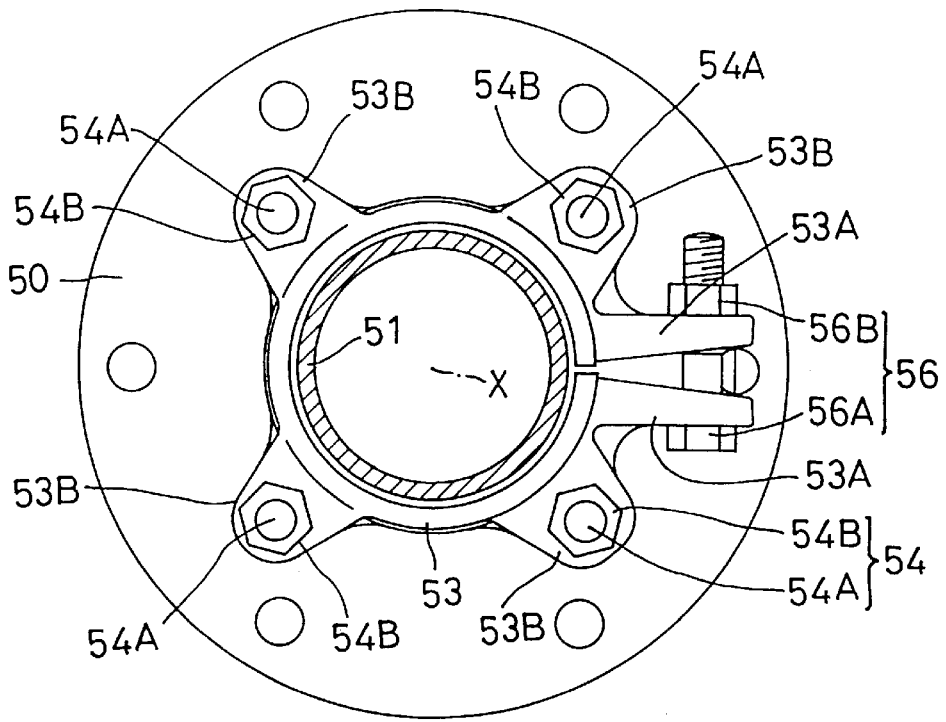
FIG. 13 is a frontal elevation of the conventional apparatus.

FIGS. 10 and 11 show a further space-regulating element relating to the fourth embodiment of the present invention. This element comprises a pin-like element 30 which extends integrally from the outer peripheral face of the retainer member 16 with the element 30 engaged with the engaging groove 21 of the press ring 24 through the through hole 19c of the brim portion 19A of the intermediate pressing element 19.

Further, the retainer member 16 consists of split ring portions 16A which may be obtained e.g. by dividing the retainer ring 6 the third embodiment into two halves.

And, the split ring portions 16A and the pin-like element 30 are formed integral of e.g. synthetic resin.

In the third embodiment described hereinbefore, the retainer member, under the zero-load condition, has a larger inner diameter than the outer diameter of the insertion pipe portion 2 and this retainer member bites into the outer periphery of the insertion pipe portion 2 only when the member receives an external force overwhelming its elastic resilience. On the other hand, in the case of the pipe connecting apparatus using this further space-regulating element relating to the fourth embodiment, when the connecting apparatus is fitted over the outer periphery of the insertion pipe portion 2, the respective split ring portions 16A, 16A will be pressed against the inner peripheral face of the press ring 24 and the pin-like elements 30 will be fitted within the engaging grooves 21 of the press ring 24. With this, the split ring portions 16A, 16A will be maintained to be spaced apart from each other in the radial direction so that the retainer projections 16b thereof will not bite into the outer peripheral face of the insertion pipe portion 2. Accordingly, the press ring 24 may be readily moved in the axial direction X. Then, with application of an external force thereto, the split ring portions 16A, 16A will be moved closer to each other towards the axis X, so that they will bite into the outer peripheral face of the insertion pipe portion 2.

Except for the constructions of the pin-like element 30 as the the space-regulating element and the retainer member 16 described above, the rest of the construction of this fourth embodiment is same as that of the third embodiment described hereinbefore. Therefore, those same components are denoted with the same reference marks or numerals in FIGS. 10 and 11 and these will not be described here in repetition.

(Other Embodiments)

In the third embodiment described hereinbefore, the shear pins 20 constituting the space-regulating element are provided at the two mutually radially opposing or substantially opposing portions of the intermediate pressing element 19 and the inner peripheral face of the press ring 24. Instead, the shear pins 20 may be provided at four positions.

In short, what is essential is that through utilization of the shearing of the space-regulating element 20, the elastic seal 13 alone be compressed in the former half of the fastening operation of the fastener means 5 and also the elastic seal 13 be capable of deforming the retainer ring 6 into the diameter-reducing direction to bite into the outer peripheral face of the insertion pipe portion 2 in association with a further fastening operation after the elastic seal 13 has reached the predetermined compressed condition. As long as this requirement is satisfied, the number of the space-regulating elements 20 to be distributed along the peripheral direction is not particularly limited in the present invention.

In the third embodiment described hereinbefore, the retainer ring 6 is provided as a C-shaped retainer ring which can be elastically deformed and reduced in its diameter along the axial direction X. Further, in the fourth embodiment, the retainer ring 6 consists of two split ring portions 16A. Still further, this retainer ring 6 may consist of more than three split ring or are portions.

In the modified construction of the third embodiment described above, at the communicating portion between the first engaging groove portion 21a and the second engaging groove portion 21b of the engaging groove 21, the resistance providing means 22 for providing resistance against the movement of the leading end of the shear pin 20 as the space-regulating element 20 is provided in the form of a block member formed of synthetic rubber. Alternatively, this resistance providing means 22 may be formed of any other elastic material or member such as a plate spring or the like.

Further, the movement of the leading end of the shear pin 20 engaged into the second engaging groove portion 21a toward the first engaging groove portion 21a may be checked by means of a pin or the like which is removably disposed.

In the respective first through fourth embodiments described above, the opposing distance in the axial direction X between the intermediate pressing element 9, 19 and the press ring 4, 24 is maintained at such a distance not to cause the diameter reduction of the retainer ring 6. Instead, the opposing distance may be maintained to such a degree to allow a limited amount of diameter-reducing deformation of the retainer ring 6 within which the retainer ring 6 will not bite into the outer peripheral face 2a of the insertion pipe portion 2.

In the respective first through fourth embodiments described above, in order to allow the space-regulating element 10 to release its space maintaining condition when the elastic seal 3, 13 has reached the predetermined compressed condition, this is realized through collapse by buckling deformation or shearing of the element 10. Instead, it is also conceivable to adapt this space-regulating element 10 so that the element may automatically return to the space-regulating condition from the space regulation released condition in response to release of the compressive force applied to the elastic seal 3. Specifically, this may be realized by forming the space-regulating element of material having a large elastic resilience or forming the element in a shape providing a large elastic resilience, for instance.

In the respective first through fourth embodiments described above, the fastener means 5 consists of the bolt 5A and the nut 5B. However, the specific construction of this fastener means is not particularly limited in this invention as long as it can effectively fasten the press ring 4, 24 and the receiver pipe portion 1 together in the a direction X For instance, the fastener means may comprise a cam fastening type construction or the like.

In the respective embodiments described above, in the former half of the fastening operation of the fastener means 5, the elastic seal 3, 13 alone is compressed; and with a continued, i.e. subsequent fastening operation of the same after the elastic seal 3, 13 has reached the predetermined compressed condition, the retainer ring 6 is allowed to deformed in the diameter reducing direction. However, the predetermined compressive force from the elastic seal 3, 13 for deforming the retainer ring 6 in the diameter reducing direction may be equal to or less in magnitude than the final compressive force obtained upon completion of the fastening operation of the fastener means 5.

Moreover, when the space regulating condition of the space-regulating element 10, 20 is released through its own collapse due to buckling deformation or shearing, the predetermined compressive force from the elastic seal 3 may be reduced temporarily. Namely, what is essential is that the subsequent fastening operation of the fastener means after the release of the space regulating condition be capable of effectively maintaining the sealed (water-tight) engagement between the receiver pipe portion 1 and the insertion pipe portion 2 while maximally maintaining the initially set insertion length relative to each other.

In the respective embodiments described above, the compression of the elastic seal via the press ring is provided by means of the fastener means which will remain there after completion of the connecting operation between the receiver pipe portion 1, 41 and the insertion pipe portion 2. However, in principle, this compression may be provided by means of any other type of fastener means such as a clamp which is to be used only temporarily at the time of the connecting operation or by any other method such as driving the press ring by applying an axial impact thereto. In the course of this, the resilient force of the compressed elastic seal which tends to expand toward the press ring will be transmitted via the intermediate pressing element to the retainer member. Then, this retainer member which is pushed back along the axial direction in this manner will be pressed against and caused to bite into the outer peripheral face 2a of the insertion pipe portion 2 by means of the cam mechanism provided between the press ring and the retainer member. As a result, any movement of the insertion pipe portion 2 relative to the receiver pipe portion 1, 41 will be prevented. Further, the resilient force of the elastic seal urging the retainer member back along the axial direction will tend to enlarge the diameter of the press ring due to the function of the cam mechanism. Hence, especially if the cam faces of the cam mechanism have a small inclination, a locked condition due to static friction will be developed between the retainer member and the press ring, so that the press ring too may be temporarily fixed in a reliable fashion.

The present invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A pipe connecting apparatus for connecting a first pipe member having an inner peripheral face and an axis with a second pipe member inserted into the first pipe member, the apparatus comprising:

an elastic seal to be disposed within a gap formed between an inner peripheral face of the first pipe member and an outer peripheral face of the second pipe member, the elastic seal being compressed in an axial direction along the axis of the first pipe member to seal the gap;

a press ring fitted on the second pipe member, the press ring being movable on the outer peripheral face of the second pipe member in the axial direction and means for axially moving said press ring;

a retainer member placed around the outer peripheral face of the second pipe member, the retainer member having a locked condition in which the retainer member is pressed against the outer peripheral face of the second pipe member and a released condition in which the retainer member is radially expanded to be released from the locked condition, the retainer member and press ring having cooperating surfaces therebetween for the retainer member to be switched over from the released condition to the locked condition in association with a movement thereof in the axial direction relative to the press ring; and a sequentially operative mechanism interposed between the press ring and the elastic seal for transmitting said axial movement of the press ring to the elastic seal as the compressive force thereto, the sequentially operative mechanism comprising an intermediate pressing element having a face to come into contact with the elastic seal and a space-regulating element attached to the intermediate pressing element, the space-regulating element being operative to press the elastic seal alone in the axial direction while maintaining an axial opposing space between the press ring and intermediate pressing element within a range allowing the released condition of the retainer member in a first state where the compressive force is below a predetermined value, the space-regulating element being operative to release the space maintenance and allow the retainer member to be switched over to the locked condition in association with the axial movement thereof relative to the press ring in a second state where the compressive force is above the predetermined value.

2. The apparatus according to claim 1, wherein the space-regulating element can be buckled between the press ring and the intermediate pressing element in response to the compressive force exceeding the predetermined value, and wherein the space-regulating element comprises a first element which is attached to the intermediate pressing element so as to extend axially from this intermediate pressing element toward the press ring.

3. The apparatus according to claim 2, wherein the space-regulating element is formed of synthetic resin and is affixed to the intermediate pressing element.

4. The apparatus according to claim 3, wherein the space-regulating element includes an engaging portion for coming into elastic axial engagement with an engaged portion in the inner peripheral face of the press ring so as to check a withdrawal movement of the retainer member interposed between the space-regulating element and the inner peripheral face of the press ring.

5. The apparatus according to claim 1, wherein a cam mechanism is interposed between the retainer member and the press ring for rendering the retainer member into the locked condition in response to the relative axial movement between the retainer member and the press ring.

6. The apparatus according to claim 1, wherein said means for axially moving said press ring including fastener means for moving the press ring toward the elastic seal and is interposed between the press ring and the first pipe member.

7. The apparatus according to claim 1, wherein the first pipe member includes at an end thereof an annular space capable of accommodating the elastic seal.

8. The apparatus according to claim 1, wherein the retainer member comprises a retainer ring having a C-shaped configuration as seen in the axial direction and deformable in a diameter-reducing direction, the retainer ring having an inner diameter which is larger under a zero-load condition than the outer diameter of the insertion pipe portion.

9. A pipe connecting apparatus for connecting a first pipe member having an inner peripheral face and an axis with a second pipe member inserted into the first pipe member, the apparatus comprising:

an elastic seal to be disposed within a gap formed between an inner peripheral face of the first pipe member and an outer peripheral face of the second pipe member, the elastic seal being compressed in an axial direction along the axis of the first pipe member to seal the gap;

a press ring fitted on the second pipe member, the press ring being movable on the outer peripheral face of the second pipe member in the axial direction and means for axially moving said press ring;

a retainer member placed around the outer peripheral face of the second pipe member, the retainer member having a locked condition in which the retainer member is pressed against the outer peripheral face of the second pipe member and a released condition in which the retainer member is radially expanded to be released from the locked condition, the retainer member and press ring having cooperating surfaces therebetween for the retainer member to be switched over from the released condition to the locked condition in association with a movement thereof in the axial direction relative to the press ring; and a sequentially operative mechanism interposed between the press ring and the elastic seal for transmitting said axial movement of the press ring to the elastic seal as the compressive force thereto, the sequentially operative mechanism being operative to press the elastic seal alone in the axial direction while maintaining the retainer member at the released condition in a first state where the compressive force is below a predetermined value, the sequentially operative mechanism being operative to allow the retainer member to be switched over to the locked condition in association with the movement thereof relative to the press ring in a second state where the compressive force is above the predetermined value, wherein the sequentially operative mechanism comprises an intermediate pressing element having a face to come into contact with the elastic seal and a space-regulating element for maintaining an axial opposing space between the press ring and intermediate pressing element within a range allowing the released condition of the retainer member in the first state, the space-regulating element being operative to release the space maintenance and allow the retainer member to be switched over to the locked condition in association with the axial movement thereof relative to the press ring in the second state, the space-regulating element comprising a first element which can be sheared between the press ring and the intermediate pressing element in response to the compressive force exceeding the predetermined value.

10. The apparatus according to claim 9, wherein the space-regulating element includes a pair of annular cylindrical portions formed and connected integrally with each other and having different diameters so as to form a stepped cross section in the initial integrally connected state, the connecting portion between the cylindrical portions being sheared in response to the compressive force exceeding the predetermined value so as to allow the two elements overlapped with each other in the radial direction.

11. The apparatus according to claim 9, wherein the space-regulating element includes a projecting portion which projects from the intermediate pressing element in the radial direction, the projecting portion supporting the press ring in the first state, the projecting portion being sheared by the press ring in response to the compressive force exceeding the predetermined value.

12. The apparatus according to claim 11, wherein the press ring includes in its inner peripheral face an engaging groove comprising of a first engaging groove into and from which the projecting portion is engageable and disengageable in the axial direction and a second engaging groove for preventing withdrawal of the projecting portion, through relative rotation in the axial direction after insertion of the projecting portion into the first engaging groove.

13. The apparatus according to claim 12, wherein the engaging groove includes a resistance providing means for providing resistance against the movement of the projecting portion of the space-regulating element between the first engaging groove and the second engaging groove.

14. The apparatus according to claim 11, wherein the space-regulating element comprises a headed shear pin removably inserted into a radially extending through hole defined in the intermediate pressing element from the side of the outer peripheral face, with withdrawal of the shear pin from the through hole being prevented through abutment between the retainer member adjacent the intermediate pressing element and the head of the shear pin.

15. The apparatus according to claim 11, wherein the projecting portion comprises a pin-line element extending integrally and radially from the outer peripheral face of the retainer member, the pin-like element being axially engageable with the press ring beyond the radially extending through hole defined in the intermediate pressing element.

16. The apparatus according to claim 15, wherein the retainer member comprises a pair of arcuate members which are joined together to present an annular configuration, the pin-like element extending integrally from an outer peripheral face of each said arcuate member.

17. The apparatus according to claim 9, wherein between the retainer member and the press ring, there is interposed a cam mechanism for rendering the retainer member into the locked condition in response to the relative axial movement between the retainer member and the press ring.

18. The apparatus according to claim 9, wherein between the press ring and the first pipe member, there is interposed said means for axially moving said press ring and includes fastener means for moving the press ring toward the elastic seal.

19. The apparatus according to claim 9, wherein the first pipe member includes at an end thereof an annular space capable of accommodating the elastic seal.

20. The apparatus according to claim 9, wherein the retainer member comprises a retainer ring having a C-shaped configuration as seen in the axial direction and deformable in a diameter-reducing direction, the retainer ring having an inner diameter which is larger under a zero-load condition than the outer diameter of the insertion pipe portion.

* * * * *

UNITED STATES PATENT AND TRADEMARK OFFICE
CERTIFICATE OF CORRECTION

PATENT NO. : 6,019,396
DATED : Feb. 1, 2000
INVENTOR(S) : Saito et al.

It is certified that error appears in the above-indentified patent and that said Letters Patent is hereby corrected as shown below:

In column 2, line 21, change "54" to -- 54A --.
In column 2, line 44, change "62" to -- 52 --.
In column 2, line 46, change "65" to -- 55 --.
In column 5, line 31, change "used" to -- utilized --.
In column 6, line 57, delete -- so --.
In column 7, line 67, change "potion" to -- portion --.
In column 8, line 57, change "2" to -- 1 --.
In column 10, line 62, change "6" to -- 5 --.
In column 17, line 42, change "are" to -- arc --.
In column 18, line 21, after the letter "X" insert -- . --.

Signed and Sealed this

Tenth Day of April, 2001

Attest:

NICHOLAS P. GODICI

Attesting Officer

Acting Director of the United States Patent and Trademark Office